US011528655B2

(12) United States Patent
Jayawardene et al.

(10) Patent No.: US 11,528,655 B2
(45) Date of Patent: Dec. 13, 2022

(54) RESILIENT MOBILE MESHED NETWORK WITH EXTENDED RANGE

(71) Applicant: CHARTER COMMUNICATIONS OPERATING, LLC, St. Louis, MO (US)

(72) Inventors: Diwelawatte Jayawardene, St. Louis, MO (US); Manish Jindal, St. Louis, MO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 602 days.

(21) Appl. No.: 15/994,066

(22) Filed: May 31, 2018

(65) Prior Publication Data

US 2019/0373536 A1 Dec. 5, 2019

(51) Int. Cl.
| | |
|---|---|
| *H04W 48/16* | (2009.01) |
| *H04W 48/20* | (2009.01) |
| *H04W 48/14* | (2009.01) |
| *H04W 72/08* | (2009.01) |
| *H04W 12/06* | (2021.01) |
| *H04W 28/24* | (2009.01) |
| *H04W 76/15* | (2018.01) |
| *H04B 17/318* | (2015.01) |
| *H04W 88/12* | (2009.01) |

(Continued)

(52) U.S. Cl.
CPC ......... *H04W 48/16* (2013.01); *H04B 17/318* (2015.01); *H04W 12/06* (2013.01); *H04W 28/24* (2013.01); *H04W 48/14* (2013.01); *H04W 48/20* (2013.01); *H04W 72/085* (2013.01); *H04W 76/15* (2018.02); *H04W 8/005* (2013.01); *H04W 84/18* (2013.01); *H04W 88/12* (2013.01)

(58) Field of Classification Search
CPC ..... H04W 48/16; H04W 76/15; H04W 12/06; H04W 28/24; H04W 48/14; H04W 48/20; H04W 72/085; H04W 8/005; H04W 84/18; H04W 88/12; H04B 17/318
See application file for complete search history.

(56) References Cited

U.S. PATENT DOCUMENTS

| | | | | |
|---|---|---|---|---|
| 6,873,839 | B2 * | 3/2005 | Stanforth | .............. H04W 40/10 |
| | | | | 455/343.2 |
| 6,879,574 | B2 * | 4/2005 | Naghian | ................. H04L 12/66 |
| | | | | 370/338 |

(Continued)

OTHER PUBLICATIONS

Frodigh, Magnus; Johansson, Per; Larsson, Peter: "Wireless ad hoc networking—The art of networking without a network" Ericsson Review, vol. No. 4, pp. 248-263 (2000).

*Primary Examiner* — Huy D Vu
*Assistant Examiner* — Bailor C Hsu
(74) *Attorney, Agent, or Firm* — Meagher Emanuel Laks Goldberg & Liao, LLP

(57) ABSTRACT

Various embodiments comprise systems, methods, architectures, mechanisms or apparatus configured to provide ad hoc, peer to peer communications among a plurality of wireless devices, wherein at least one wireless device is selected to further communicate with a wireless network to provide thereby backhaul services to other wireless devices, wherein the at least one wireless device providing backhaul services is dynamically selected in accordance with respective wireless network signal strength indicia.

18 Claims, 6 Drawing Sheets

(51) Int. Cl.
*H04W 84/18* (2009.01)
*H04W 8/00* (2009.01)

(56) References Cited

U.S. PATENT DOCUMENTS

| | | | |
|---|---|---|---|
| 7,251,570 B2* | 7/2007 | Hancock | H04B 7/2606 |
| | | | 702/57 |
| 7,260,362 B2* | 8/2007 | Teibel | H04W 36/16 |
| | | | 455/69 |
| 7,336,927 B2 | 2/2008 | Diaz Cervera et al. | |
| 7,697,893 B2 | 4/2010 | Kössi et al. | |
| 8,005,486 B2* | 8/2011 | Pahlavan | G01S 5/0289 |
| | | | 342/126 |
| 8,494,593 B2* | 7/2013 | Black | H04W 52/18 |
| | | | 455/571 |
| 8,599,865 B2* | 12/2013 | Venkataswami | H04L 47/24 |
| | | | 370/401 |
| 8,621,203 B2* | 12/2013 | Ekberg | H04L 9/321 |
| | | | 713/156 |
| 9,119,154 B2 | 8/2015 | Etemad et al. | |
| 9,820,200 B2* | 11/2017 | Potra | H04W 36/14 |
| 10,320,675 B2* | 6/2019 | Holmberg | H04L 67/63 |
| 2002/0145978 A1* | 10/2002 | Batsell | H04L 45/20 |
| | | | 370/238 |
| 2005/0099943 A1* | 5/2005 | Naghian | H04W 72/00 |
| | | | 370/229 |
| 2005/0208966 A1* | 9/2005 | David | H04L 12/12 |
| | | | 455/553.1 |
| 2007/0183344 A1* | 8/2007 | Joshi | H04L 41/12 |
| | | | 370/254 |
| 2007/0258427 A1* | 11/2007 | Shaheen | H04W 76/12 |
| | | | 370/338 |
| 2010/0284388 A1* | 11/2010 | Fantini | H04W 48/18 |
| | | | 370/338 |
| 2012/0188949 A1* | 7/2012 | Salkintzis | H04L 45/308 |
| | | | 370/329 |
| 2012/0309417 A1* | 12/2012 | Blom | H04L 51/20 |
| | | | 455/456.1 |
| 2012/0309425 A1* | 12/2012 | El Khayat | H04L 67/18 |
| | | | 455/456.3 |
| 2013/0136025 A1* | 5/2013 | Li | H04W 28/08 |
| | | | 370/252 |
| 2014/0233412 A1 | 8/2014 | Mishra et al. | |
| 2015/0230275 A1* | 8/2015 | Kerpez | H04W 72/0406 |
| | | | 370/329 |
| 2015/0245276 A1* | 8/2015 | Lee | H04W 40/246 |
| | | | 370/254 |
| 2016/0135107 A1* | 5/2016 | Hampel | H04W 76/10 |
| | | | 370/238 |
| 2016/0360458 A1* | 12/2016 | Lubenski | H04W 76/12 |
| 2017/0026951 A1* | 1/2017 | Lou | H04L 5/001 |
| 2017/0135147 A1* | 5/2017 | Belghoul | H04W 76/36 |
| 2017/0280435 A1* | 9/2017 | Egner | H04W 52/0261 |

* cited by examiner

RESILIENT MOBILE MESHED NETWORK WITH EXTENDED RANGE

FIELD OF THE DISCLOSURE

The present disclosure generally relates to wireless networking and, in particular, ad hoc mesh networking of wireless devices with dynamic selection of backhaul hosting wireless devices.

BACKGROUND

Mobile or cellular networks/systems using licensed spectrum (e.g., Third Generation (3G) Partnership Project (3GPP) networks, 3GPP2 networks, Long Term Evolution (LTE) networks, 5G networks and the like) and wireless local area networks/systems (WLANs) using unlicensed bands of spectrum (e.g., Wireless Fidelity (WiFi) access networks and the like operating at 2.4 GHz, 5 GHz and other spectral regions) are used for providing wireless services in a complementary manner to wireless/mobile devices.

Mobile/cellular networks generally provide macro cellular coverage outdoors and within those areas of buildings and other structures (e.g., tunnel) where mobile network signal of sufficient strength exists (i.e., signal penetrating the building at sufficient strength or signal boosted/distributed therein). Wireless local area networks generally serve enterprises, residences, public venues, and the like.

Device driven ad-hoc networks rely on a WiFi hotspot being created by a host device connected to a mobile network to provide a wireless access point (WAP) for use by other devices. In this situation the other devices use the WiFi connection to transfer data to and from the mobile network via the host device, which data traverses the entirety of the ad hoc network. Such data may comprise voice communications, streaming media, email, messaging and any other mobile service.

All data transferred to and from the mobile network by the host device consumes bandwidth allocated to the host device, such as bandwidth associated with a mobile network subscription associated with the host device. Direct communication between devices connected to the ad hoc network must also pass through the mobile network.

SUMMARY

Various deficiencies in the prior art are addressed by systems, methods, architectures, mechanisms or apparatus configured to provide ad hoc, peer to peer communications among a plurality of wireless devices, wherein at least one wireless device is selected to further communicate with a wireless network to provide thereby backhaul services to other wireless devices, wherein the at least one wireless device providing backhaul services is dynamically selected in accordance with respective wireless network signal strength indicia.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
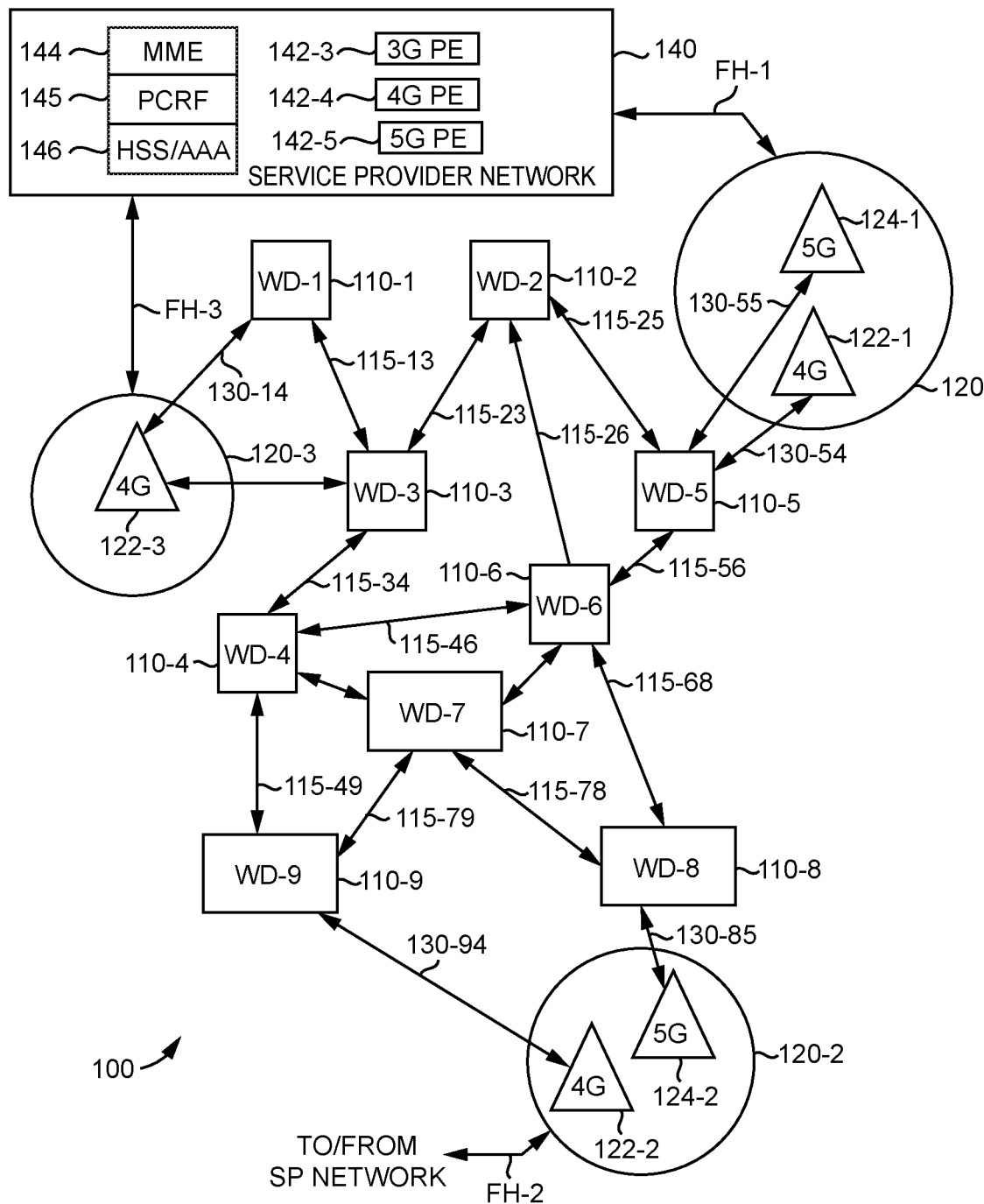
FIG. 1 depicts a high-level block diagram of a system benefiting from various embodiments.

FIG. 1 depicts a high-level block diagram of a system benefiting from various embodiments. Specifically, the system 100 depicted in FIG. 1 comprises a plurality of wireless devices (e.g., mobile devices) denoted as 110-1, 110-2 and so on up to 110-9 (collectively wireless devices 110), a plurality of mobile network access devices 120 illustratively 4G/LTE 122 and 5G 124 access devices (e.g., base stations, eNodeBs and the like) and a service provider network 140, illustratively including 3G provider equipment (PE) 142-3, 4G PE 142-4 and/or 5G PE 142-5, as well as elements implementing network management, services and accounting functions such as a Mobility Management Entity (MME) 144, Policy and Charging Rules Function (PCRF) 145, Home Subscriber Server (HSS)/Authentication, Authorization and Accounting (AAA) server 146 and/or and various other provider equipment (not shown) suitable for implementing mobile network infrastructure such as discussed herein with respect to 3G, 4G, 5G and/or other mobile network types.

The wireless devices 110 are generally described herein as mobile phones including a mobile network interface configured to support mobile network communication with one or more radio access networks (RANs) such as 3G, 4G/LTE, 5G and/or other RANs providing mobile network services. The wireless devices 110 further include the wireless network interface configured to support wireless network communication between the various wireless/mobile devices to form thereby and ad hoc mesh network of wireless/mobile devices.

Thus, FIG. 1 depicts a plurality wireless devices 110 wherein each wireless device is connected to at least one other wireless device via respective wireless network interfaces to form thereby an ad hoc mesh network, and wherein one or more of the wireless devices is further connected to a mobile network to support thereby bearer channels communicating data between the various wireless devices of the ad hoc mesh network and respective source/destination devices communicating with the mobile network or networks connected thereto (e.g., access networks, core networks, other mobile networks and the like). The bearer channels support receiving downlink bearer traffic from the mobile network communication interface (i.e., mobile network) and forwarding the received downlink bearer traffic to other wireless devices via the network communications interface (i.e., ad hoc network). The bearer channels support receiving uplink bearer traffic via the network communications interface (i.e., ad hoc network) and forwarding the received uplink bearer traffic via the mobile network communication interface (i.e., mobile network).

The ad hoc mesh network of the various embodiments is formed as wireless devices discover that other wireless devices are nearby and establish communications there between. The network 100 of FIG. 1 is depicted as comprising nine wireless devices 110 where each of the wireless devices 110 is coupled by the ad hoc mesh network to some but not all of the other wireless devices 110, and where some of the wireless devices 110 are coupled to the service provider network 140 via a mobile network access device 122-124.

Each wireless device 110 operates in a discovery mode to discover other proximate wireless devices 110 and establish communications with such devices via their respective wireless network interfaces in accordance with an ad hoc network protocol. In various embodiments, a common authentication key is used by each wireless device.

The various anchor and non-anchor wireless devices 110 utilize mobile services such as voice, data, streaming media and so on as supported via one or more wireless devices 110 operably coupled to the mobile network 140 as anchor devices.

Each wireless device 110 operates to monitor and share with other wireless devices 110 various anchor related criteria such as the type, performance and/or quality of its local (i.e., reachable or proximate) mobile network access devices 122/124 such that one or more anchor devices may be selected in accordance with a common selection criteria. As previous noted, the type of access device may comprise 3G, 4G/LTE, 5G and the like. Depending upon the mobile services required by non-anchor wireless devices 110, or the subscription plan or data/bandwidth utilization or other capabilities of an anchor wireless device 110, one type of access device 122/124 may be preferred over another type. Further, the signal quality of the mobile network access devices 122-124 is monitored, such as the signal strength, quality of service deliverable by the signal, bit error rate associated with the signal and/or other performance metrics.

Each wireless device receives type performance and/or qualitative information pertaining to the local mobile network access devices associated with the various other wireless devices such that each wireless device may independently make the same determination as to which one or more of the wireless devices forming the ad hoc network is to be utilized as an anchor device.

Those wireless devices determined to be anchor devices enter an anchor device operating mode wherein they provide backhaul data services in support of the mobile services utilized by the various wireless devices forming the ad hoc mesh network.

As the distance between wireless devices increases or decreases as the devices move, the ability to maintain direct communication between the devices changes. As such, new wireless devices may discover and join the ad hoc networks, connected wireless devices may drop out of the ad hoc network and so on. Similarly, those wireless devices operating as an anchor devices may also experience increases or decreases in ability to maintain communication of sufficient quality with the mobile network. As such, new anchor devices may be selected as needed, existing anchor devices may revert to a non-anchor mode of operation (or drop from the ad hoc network altogether) and so on. Thus, the ad hoc mesh network is continually changing in terms of wireless devices forming the network as well as the anchor devices supplying backhaul services.

For example, referring to FIG. 1, wireless device 110-1 is depicted as communicating with a 4G access device 122-3, wireless device 110-9 is depicted as communicating with a 5G access device 122-2, and wireless device 110-5 is depicted as communicating with both a 4G access device 122-1 and a 5G access device 124-1. All of the access devices 122/124 communicate via backhaul channels to the service provider network 140 and, subsequently, other networks, servers, service providers and the like connected directly or indirectly thereto.

It will be appreciated by those skilled in the art that the wireless devices 110 may comprise any wireless device mobile or stationary, such as a computing device, tablet, routing device and the like.

The various embodiments advantageously enable direct communication between devices connected to the ad hoc mesh network, thereby avoiding the consumption of anchor mobile network bandwidth.

The various embodiments advantageously support dynamic addition/deletion of users/devices. Specifically, various embodiments each device connected to the ad hoc mesh network as provided with the same administrative privileges such that any of the devices may perform administrative tasks such as authenticating/admitting new devices to the ad hoc network, terminating or restricting access to the ad hoc network by some devices and so on.

Figure 2:
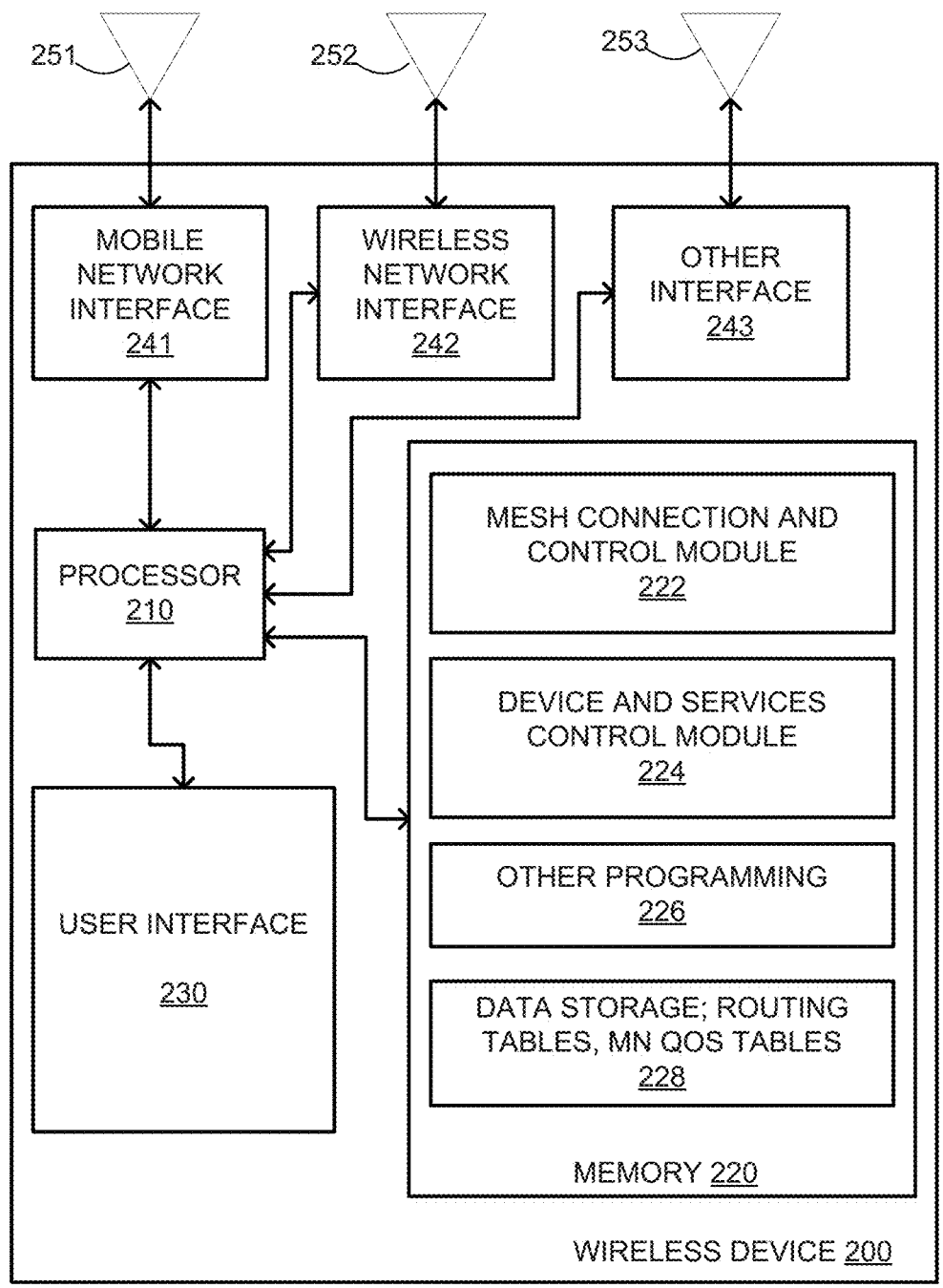
FIG. 2 depicts a high-level block diagram of an exemplary wireless device suitable for use in the various embodiments.

FIG. 2 depicts a high-level block diagram of an exemplary wireless device suitable for use in the various embodiments. Specifically, the wireless device 200 of FIG. 2 is suitable for use in implementing the wireless devices 110 described above with respect to the system 100 of FIG. 1.

The wireless device 200 of FIG. 2 is depicted as including as including one or more processor(s) 210, a memory 220, a user interface 230, a mobile network interface/transceiver 241 and antenna 251, a wireless network interface/transceiver 242 and antenna 252, and an optional other interface/transceiver 243 and antenna 253.

The processor(s) 210 is coupled to, and adapted to cooperate with, the memory 220, the user interface 230 and the communications interfaces/transceivers 241-243 as well as various other support circuitry (not shown) to provide the various functions as described herein with respect to the wireless device 200, local device 110 and the like.

Memory 220 includes random access memory (RAM), read only memory (ROM), and/or flash memory, and stores information in the form of data and instructions. These instructions that can be executed by processor(s) 210. Various types of instructions may be stored in memory 220. For instance, memory 220 may store instructions that control the operation of communication interfaces/transceivers 241-243, the operation of user interface 230 as well as the operation of other elements within the wireless device 200.

The user interface 230 facilitates the exchange of information with a user. The user interface 230 may comprise various user input and output devices, such as a keyboard, a display device, a touch screen display device, audio speakers and the like to enable user to enter information into the wireless device 200 as well as view information provided by the wireless device 200.

The mobile network interface 241 and antenna 251 as depicted herein are configured to support communications with a mobile/cellular network, such as a 3G, 4G/LTE 5G or other mobile network.

The wireless network interface 242 and antenna 252 as depicted herein are configured to support communications with wireless local area networks/systems (WLANs) such as Wi-Fi hotspots established by other wireless/mobile devices 200 110 operating as Wi-Fi hotspot anchors.

The wireless network interface 242 and antenna 252 as depicted herein are also configured to support communications with other wireless devices 200/110 such as described herein within the context of establishing and adapting an ad hoc mesh network of mesh network member (MM) wireless devices 200/110.

The optional other interface 243 and antenna 253 as depicted herein are configured to support communications with other wireless devices 200/110 via other communications means/protocols such as Bluetooth, ultra-wideband (UWB) and the like.

The memory 220, generally speaking, stores programs, data, tools and the like that are adapted for use in providing various functions as described herein with respect to the figures. For example, the memory 220 is depicted as storing instructions associated with a mesh connection a control module 222, a device and services control module 224, other programming 226 as well as data storage 228 (including storage for mesh network routing tables and related information, mobile network QoS tables and related information), which instructions cause the respective modules either individually or in combination to perform the various functions of the embodiments described herein. The memory 220 stores instructions controlling the transmission and reception of data via the various interfaces 241-243 in accordance with the appropriate communications protocols, data and control formats, timing requirements, packet structures and the like.

Figure 3:
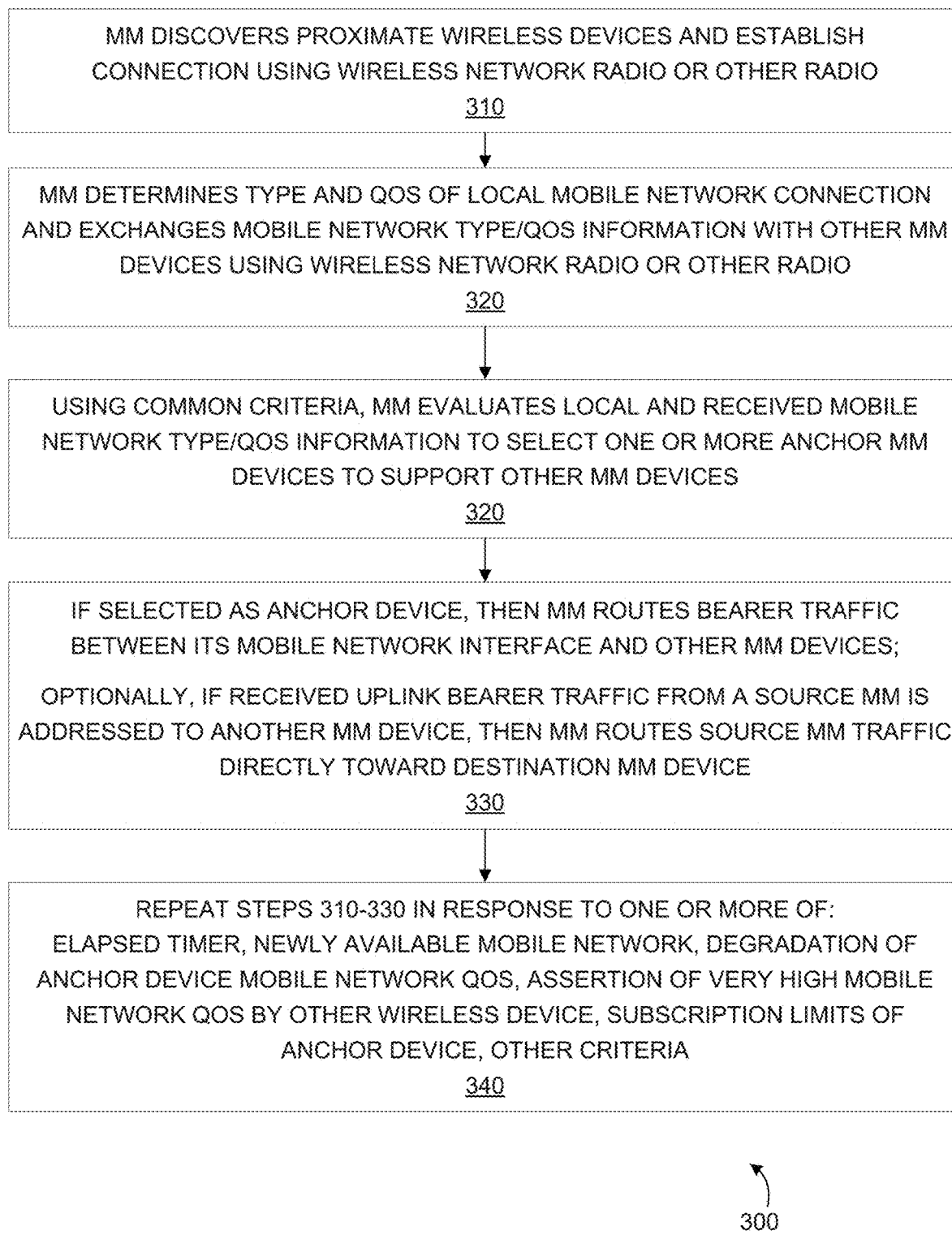
FIG. 3 depicts a method according to one embodiment.

FIG. 3 depicts a method according to one embodiment. Specifically, FIG. 3 depicts a method 300 suitable for use by each of the wireless devices 200/110 described above with respect to FIGS. 1-2.

At step 310, each wireless device 200/110 enters a discovery mode wherein the wireless device discovers proximate wireless devices and establishes a connection thereto using the wireless network radio or other radio. Illustrative embodiments of the discovery mode 310 are described in more detail below with respect to FIG. 4 (existing MM devices) and FIG. 5 (candidate MM devices).

At step 320, each MM wireless device 200/110 examines various criteria associated with an ability to perform hosting/anchor functions, such as the type and QoS of its respective local mobile network connections (i.e., local mobile network access points such as for 3G, 4G/LTE, 5G etc.), subscription information such as amount of mobile network data allowed, utilization of allowed data, allowed data rate, mobile network subscription tier QoS and the like, and transmits this information toward each of the other MM wireless devices 200/110 forming the ad hoc mesh network. This information may be stored in, illustratively, MM QoS tables and/or other locations within the MM.

At step 330, each MM wireless device 200/110 uses the same criteria to evaluate the local and received mobile network type/QoS information to select one or more anchor devices to support the other ad hoc mesh network wireless devices. A MM wireless device 200/110 selected as an anchor device enters an anchor mode of operation wherein bearer traffic associated with the various nodes of the ad hoc mesh network is supported/transported via the mobile network interfaces of the anchor device.

In some embodiments, the wireless device exhibiting the highest mobile network signal strength is selected as the anchor device. In some embodiments, the number of anchor devices selected is proportionate to the number of nodes within the ad hoc mesh network. In some embodiments, the number of anchor devices is selected such that each wireless device is within a predefined number of hops (e.g., two, three, five or some other number) of an anchor. In some embodiments, an anchor device is not selected if subscription or data plan associated with the anchor device is utilized beyond a threshold level (e.g., 50%, 80%, 90% or some other amount). In some embodiments, wireless devices associated with 5G networks are preferentially selected as anchors over wireless devices associated with other network types. In some embodiments, provider information relating to congestion or other network conditions is included in the evaluation performed by each wireless device and determining one or more anchor devices. In some embodiments, the ad hoc mesh network is divided into a plurality of areas or zones where each of the areas or zones is served via a respective one or more anchors.

At step 340, steps 310-330 are repeated in response to one or several criteria, such as periodically (e.g., elapsed countdown timer), a newly available mobile network or type of mobile network as indicated by one or more wireless devices, degradation of mobile network QoS of an existing anchor, assertion of a very high mobile network QoS by an existing non-anchor, indication of excessive data consumption or data utilization is indicated by an existing anchor and/or other criteria. Thus, various embodiments provide dynamic adaptation of backhaul links to the ad hoc mesh network to balance anchor loading, to utilize lower cost mobile network services, to provide redundancy, to provide resiliency and to otherwise ensure that the mobile services utilized by the various wireless devices within the ad hoc mesh network are maintained an appropriate quality of service level.

Figure 4:
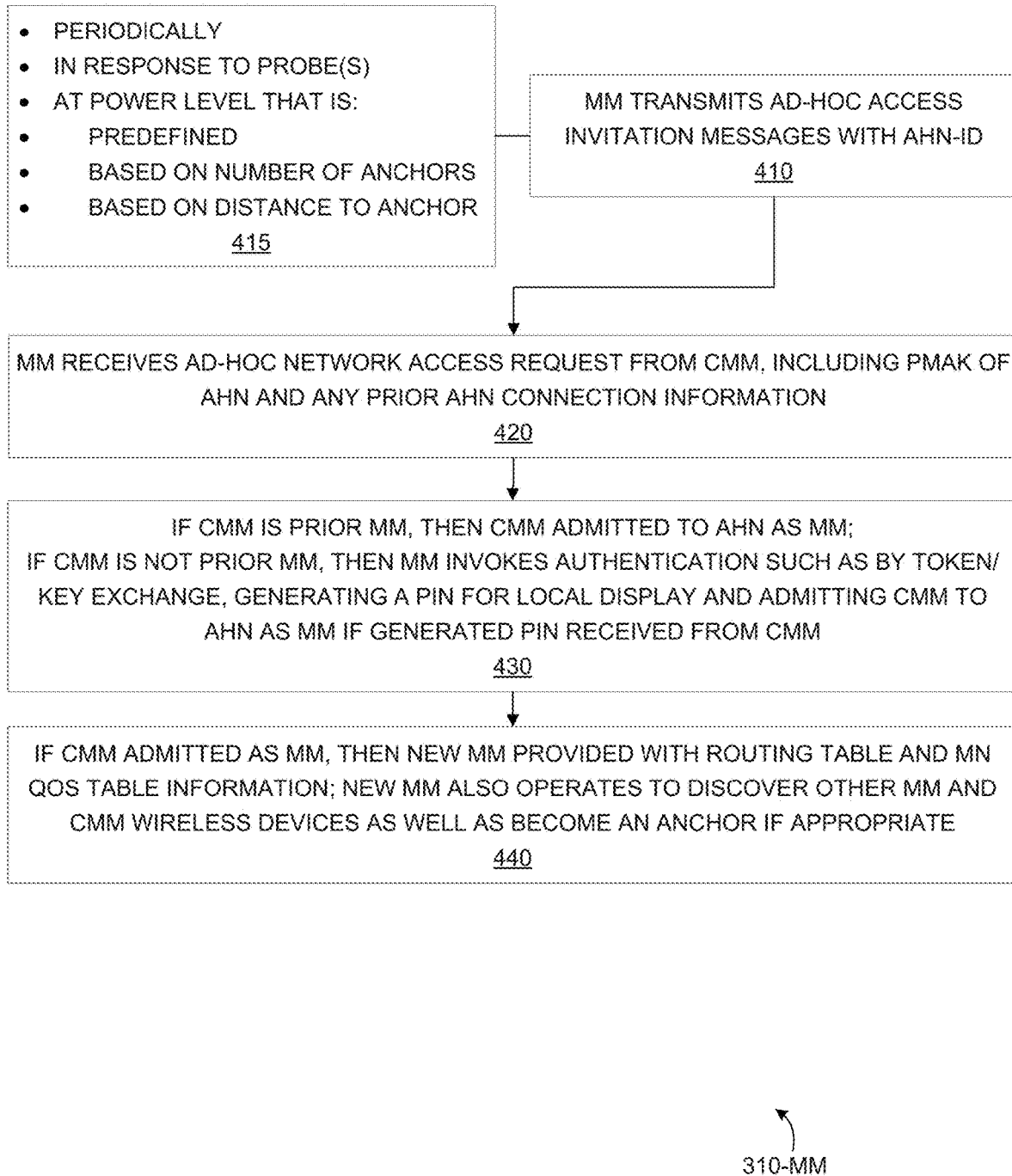
FIG. 4 depicts a discovery method suitable for use by a mesh network member (MM)

FIG. 4 depicts a discovery method suitable for use by a mesh network member (MM). Generally speaking, the method 400 of FIG. 4 may be used by existing MM wireless devices to discover nearby MM wireless devices such that routing tables associated with the ad-hoc mesh network (AHN) may be responsively updated, and to discover nearby candidate mesh network member (CMM) wireless devices for possible admission/authentication into the AHN.

At step 410, the MM transmits an Ad-Hoc network access invitation message including the identification number (AHN-ID) of the Ad-Hoc network. Referring to box 415, the invitation may be transmitted periodically (e.g., every 100 ms, every 500 ms, every second etc.) or in response to a received probe such as may be transmitted by a nearby wireless device that is a member of the Ad-Hoc network already (e.g., and moved into RF range of the MM) or a nearby wireless device that is a candidate for mesh network membership (CMM). The Ad-Hoc network access invitation message may be transmitted at a predefined power level (e.g., −3 dB of max power for the spectral region), at a power level based on a number of anchors used within the Ad-Hoc network, at a power level based upon the distance to an other anchor or some other criteria.

At step 420, the MM receives an Ad-Hoc network access request from a CMM, including a private mesh authorization key (PMAK) and any prior AHN connection information, where the PMAK is necessary for authentication to, and communication within, the AHN.

At step 430, if the CMM that transmitted the Ad-Hoc network access request is determined to be a prior MM of the Ad-Hoc network (optionally, of a related Ad-Hoc network), then the CMM is admitted to the AHN as a MM. This determination is based upon the prior AHN connection information received from the CMM, such the last few (e.g., 3-5) PMAKs used by the CMM. Specifically, since the PMAK of the AHN may be changed from time to time by any of the anchor MMs, the CMM may have been part of the AHN but disconnected from the AHN prior to a PMAK change such that the CMM is a prior MM and should be readmitted to the AHN. If the CMM is not a prior MM of the AHN, then the MM invokes an authentication process such as by a token/key exchange or other technique. In one embodiment, the MM generates a personal ID (PIN) for local display (e.g., the screen of a mobile phone if the MM is a mobile phone) such that the PIN may be entered into the CMM (e.g., via the user interface of the CMM). If the CMM provides the PIN to the MM then the MM admits the CMM to the AHN.

At step 440, if the CMM is admitted to the AHN as a MM, then the newly admitted MM is provided with routing table and related information to ensure that packets are routed properly within the AHN by the new MM. Further, the newly admitted MM also operates to discover other MM wireless devices for routing within the AHN, and to discover CMM wireless devices for potential admission to the AHN. Further, the newly admitted MM operates to become an anchor MM if appropriate. The general operating modes of the MM are described above with respect to FIGS. 2-3.

Figure 5:
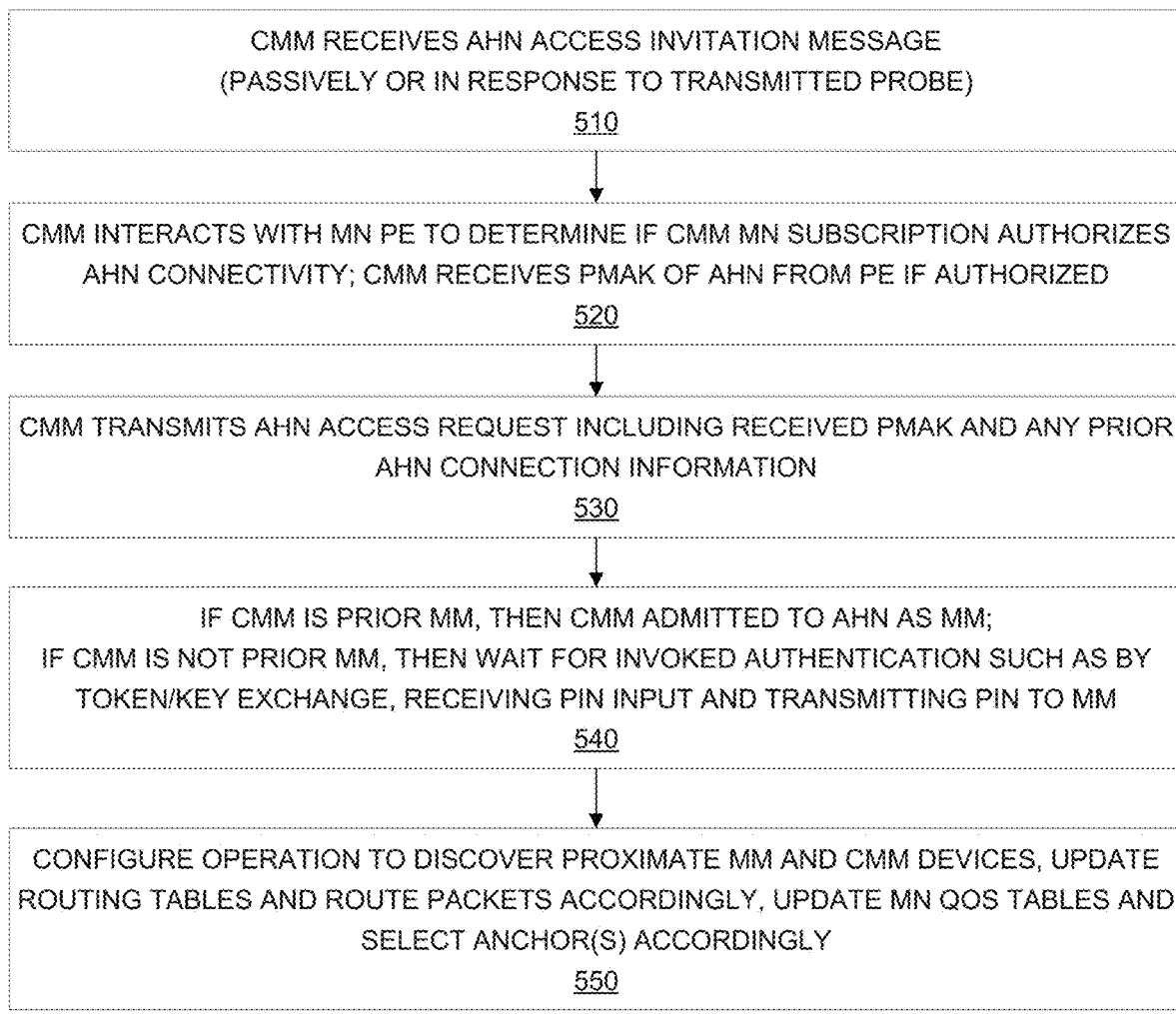
FIG. 5 depicts a discovery method suitable for use by a candidate mesh network member (CMM)

FIG. 5 depicts a discovery method suitable for use by a candidate mesh network member (CMM). Generally speaking, the method 500 of FIG. 5 may be used by non-mesh network members (e.g., CMMs) which may have MN subscriptions that include AHN membership/services.

At step 510, a CMM (e.g., a newly local or prior MM) receives an AHN access invitation request, either passively or in response to a probe transmitted by the CMM.

At step 520, the CMM interacts with the mobile network (MN) provider equipment (PE) management elements (e.g., PCRF 145 or similar) to determine is the MN subscription of the CMM includes an authorization for connection with the AHN. If so, then the MN PE provides the CMM with the PMAK of the AHN.

At step 530, the CMM transmits an AHN access request, including the received PMAK and any prior AHN connection information such as stored PMAKs from prior AHN membership.

At step 540, if the CMM is a prior MM for the AHN, then the MM interacting with the CMM will admit the CMM to the AHN as a MM. If the CMM is not a prior MM for the AHN, then the CMM waits for the MM interacting with the CMM to invoke an authentication process such as described above with respect to step 430 of the method 400 of FIG. 4 (e.g., the CMM receives user input indicative of a PIN generated by the MM and transmits the PIN to the MM, whereupon the MM admits the CMM to the AHN).

At step 550, the newly admitted MM is configured to operate in accordance with the AHN; namely, discovering proximate MM and CMM devices for potential admission to the AHN, updating routing tables in accordance with dynamic changes to the AHN and routing packets/traffic accordingly, updating MN QoS tables and the like in accordance with MN monitoring, and selecting new anchor MMs in response, such as entering an anchor mode if such mode is appropriate.

The above-described embodiments contemplate that an ad hoc network member such as an anchor member will receive ad-hoc network access requests from wireless devices and responsively establish ad hoc communications with requesting wireless devices having a current private mesh authorization key (PMAK) associated with the ad hoc network.

In various embodiments, where a requesting wireless device does not have the current PMAK, the anchor member will wait for an invoked authentication to the mobile network for requesting wireless devices (e.g., the requesting device interacts with the mobile network or other authentication authority to receive the information it needs, such as the current and/or past PMAKs and/or other information).

In various embodiments, where a requesting wireless device does not have the current PMAK, the anchor member a PIN may be generated by the anchor member or some other authorized entity such that the PIN may be transmitted to the anchor member by the requesting wireless device, whereupon the anchor may establish ad hoc communications with a requesting wireless devices.

In various embodiments, the routing tables cause anchor devices to route intra-ad-hoc-network bearer traffic within the ad-hoc network where the bearer traffic has a destination address associated with an ad hoc network member. In this manner, such traffic is not routed unnecessarily to (and received back from) the mobile network.

In various embodiments, the routing tables are updated each time an anchor member establishes (or loses/terminates) communications with a wireless device. Such routing tables are transmitted to other members of the ad hoc network such that the routing tables are kept substantially accurate.

Figure 6:
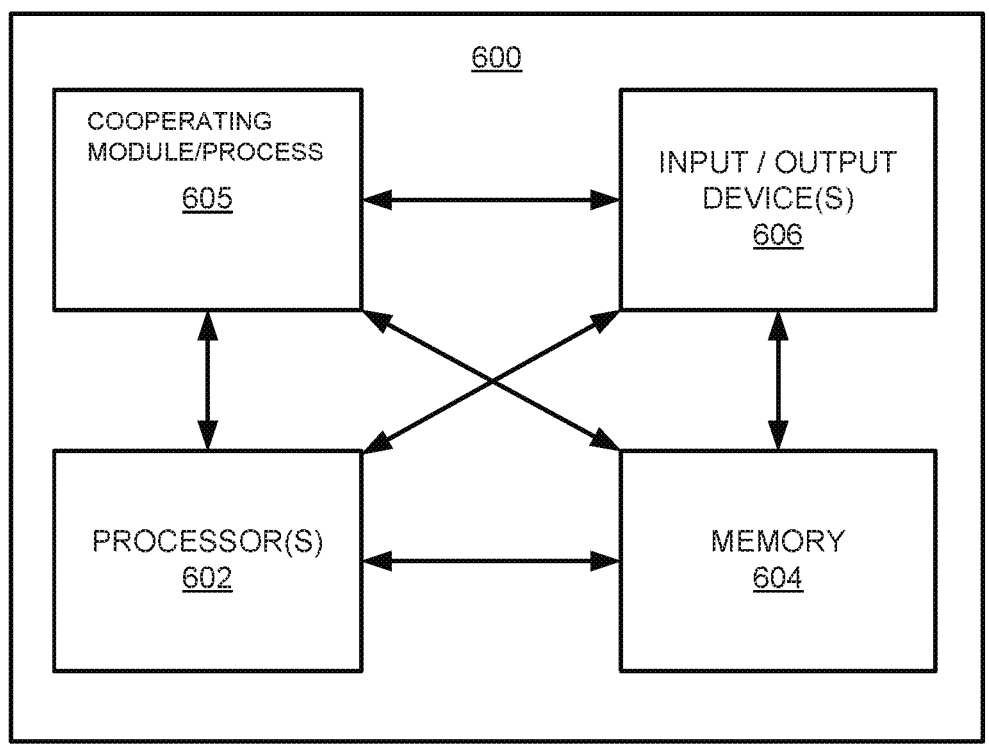
FIG. 6 depicts a high-level block diagram of a computing device suitable for use in implementing various devices for performing functions such as described herein.

FIG. 6 depicts a high-level block diagram of a computing device suitable for use in implementing various devices for performing functions such as described herein, such as implementing one or more of the functional elements described herein with respect to the various figures.

As depicted in FIG. 6, computing device 600 includes a processor element 603 (e.g., a central processing unit (CPU) or other suitable processor(s)), a memory 604 (e.g., random access memory (RAM), read only memory (ROM), and the like), a cooperating module/process 605 (e.g., network transceivers), and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive, solid state drive and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A wireless device normally configured for communicating with provider equipment (PE) of a mobile network to access therefrom mobile network services for use by the wireless device, comprising:
   an interface configured for mobile network communication with mobile network access devices;
   an interface configured for wireless network communication with wireless network devices; and
   a processor configured to:
      establish ad hoc communications with one or more other wireless devices via a wireless network in communication with the wireless network communication interface;
      determine local anchor criteria including a quality of service (QoS) level associated with a local mobile network in communication with the mobile network communication interface;
      transmit, via said wireless network, a message indicative of the local anchor criteria;
      receive, via said wireless network, messages indicative of local anchor criteria associated with one or more other wireless devices; and
      in response to said local anchor criteria favorably comparing to said local anchor criteria associated with one or more other wireless devices, causing said wireless device to enter an anchor mode of operation, said anchor mode of operation comprising:
         receiving mobile network traffic via the mobile network communication interface, and transmitting received mobile network traffic for other wireless devices via the wireless network communication interface; and
         receiving wireless network traffic via the mobile network communication interface, and transmitting received wireless network traffic via the mobile network communication interface.

2. The apparatus of claim 1, wherein said local anchor criteria comprises a signal strength.

3. The apparatus of claim 1, wherein said local anchor criteria comprises one or more of a signal strength and a bit error rate (BER).

4. The apparatus of claim 1, wherein said local anchor criteria comprises at least one of a Quality of Service (QoS) measure and a mobile network type.

5. The apparatus of claim 1, wherein said local anchor criteria comprises a signal strength and a mobile network type.

6. The wireless device of claim 1, wherein said ad hoc communications are performed in accordance with a peer to peer protocol using a common authentication key.

7. The wireless device of claim 1, wherein said processor is further configured to periodically transmit an ad hoc access invitation at a predetermined power level.

8. The wireless device of claim 7, wherein said processor is configured to receive ad-hoc network access requests from wireless devices, and to establish ad hoc communications with those wireless devices having both current and prior private mesh authorization keys (PMAKs) associated with the ad hoc network.

9. The wireless device of claim 7, wherein said processor is configured to receive ad-hoc network access requests from wireless devices, and to establish ad hoc communications with requesting wireless devices having a current private mesh authorization key (PMAK) associated with the ad hoc network.

10. The wireless device of claim 7, wherein said processor is configured to receive ad-hoc network access requests from wireless devices, and to wait for an invoked authentication to the mobile network for requesting wireless devices not having a current private mesh authorization key (PMAK) associated with the ad hoc network.

11. The wireless device of claim 7, wherein said processor is configured to receive ad-hoc network access requests from wireless devices, and to establish ad hoc communications with a requesting wireless devices not having a current private mesh authorization key (PMAK) associated with the ad hoc network in response to receiving a personal ID (PIN) from the requesting wireless devices.

12. The wireless device of claim 11, wherein said processor is configured to locally generate the PIN in response to receiving an ad-hoc network access request from a wireless devices not having a current PMAK.

13. The wireless device of claim 1, wherein said processor is further configured to periodically transmit an ad hoc access invitation at a power level determined using at least one of a number of ad hoc network anchors and a distance to a neighboring ad hoc network anchor.

14. The wireless device of claim 1, wherein said processor is further configured to route wireless network traffic with a destination address associated with an ad hoc network member directly toward the destination address ad hoc network member instead of the mobile communications network.

15. The wireless device of claim 1, wherein said processor is configured to:
route said mobile network traffic in accordance with an ad hoc network routing table;
update said ad hoc network routing table in response to detected changes in wireless devices connected to said ad hoc network; and
transmit said updated routing table to other anchor devices in response to said updates.

16. The wireless device of claim 1, wherein said processor is configured to update said ad hoc network routing table in response to receiving an updated routing table from another ad hoc network member.

17. A method, comprising:
at a wireless device, establishing ad hoc communications with one or more other wireless devices via a local wireless network;
at the wireless device, determining local anchor criteria including a quality of service (QoS) level associated with a mobile network in communication with the wireless device;
at the wireless device, transmitting via said wireless network a message indicative of the local anchor criteria;
at the wireless device, receiving via said wireless network, messages indicative of local anchor criteria associated with one or more other wireless devices; and
at the wireless device, entering an anchor mode of operation in response to said local anchor criteria favorably comparing to said local anchor criteria associated with one or more other wireless devices, said anchor mode of operation comprising:
receiving mobile network traffic via a mobile network communication interface, and transmitting received mobile network traffic for other wireless devices via a wireless network communication interface; and
receiving wireless network traffic via the mobile network communication interface, and transmitting received wireless network traffic via the mobile network communication interface.

18. A non-transitory computer readable medium storing instructions which, when executed by a computing device, cause the computing device to perform a method, comprising:
establishing ad hoc communications with one or more other wireless devices via a wireless network in communication with a wireless network communication interface;
determining local anchor criteria including a quality of service (QoS) level associated with a local mobile network in communication with a mobile network communication interface;
transmitting, via said wireless network, a message indicative of the local anchor criteria;
receiving, via said wireless network, messages indicative of local anchor criteria associated with one or more other wireless devices; and
in response to said local anchor criteria favorably comparing to said local anchor criteria associated with one or more other wireless devices, causing said wireless device to enter an anchor mode of operation, said anchor mode of operation comprising:
receiving mobile network traffic via the mobile network communication interface, and transmitting received mobile network traffic for other wireless devices via the wireless network communication interface; and
receiving wireless network traffic via the mobile network communication interface, and transmitting received wireless network traffic via the mobile network communication interface.

* * * * *